R. E. HELLMUND.
CONTROL SYSTEM.
APPLICATION FILED JULY 12, 1915.
1,303,308
Patented May 13, 1919.
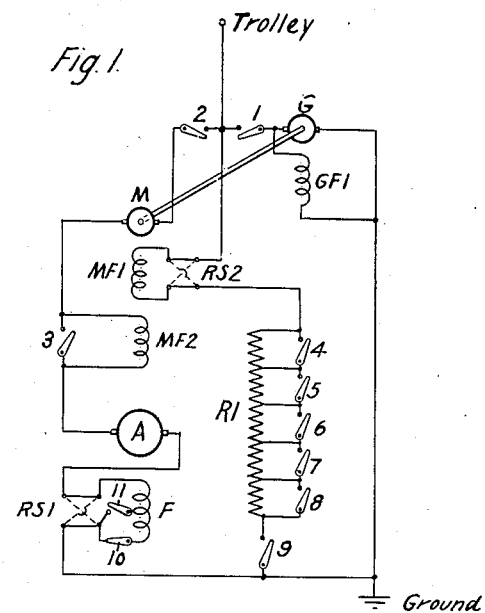
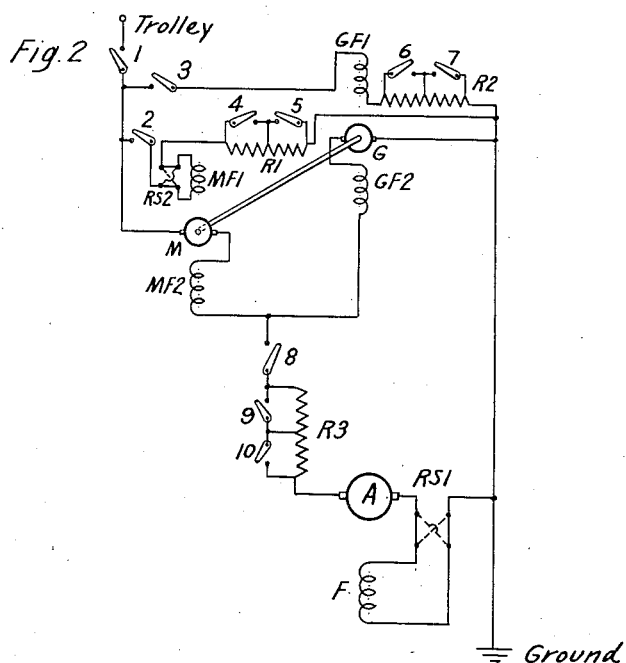
WITNESSES:
Fred H. Miller
W. R. Coley
INVENTOR
Rudolf E. Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,303,308.        Specification of Letters Patent.        Patented May 13, 1919.

Application filed July 12, 1915. Serial No. 39,375.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Control Systems, of which the following is a specification.

My invention relates to systems of control, and it has special reference to the control of electric vehicle motors and the like that are adapted for regenerative operation.

The object of my invention is to provide, in a system of the above-indicated character, a dynamo-electric machine which shall have a straight series characteristic, that is, its series field winding shall be excited solely by the armature current, during regenerative operation.

Heretofore the majority of regenerative systems for electric vehicle motors of the series type have embodied means, in the form of a battery or motor-generator set, to impress a "shunt" excitation upon the field winding in addition to the current received from the armature of the regenerating machine. In such systems, a sudden variation in the regenerated current has often caused excessive distortions of the field flux, with consequent "flash-over" trouble. Various special means have been proposed to overcome the difficulties, but it will be appreciated that, inherently, no such system can be as satisfactory as a system embodying a machine having a straight series characteristic during regeneration, whereby the armature current and field current are identical at all times, and excessive field flux distortions are substantially precluded.

According to my present invention, I provide a system embodying a machine having the above-mentioned desirable characteristic and I employ a motor-generator set, or the like, in conjunction with the main machine, in a novel manner, to effect satisfactory regenerative operation, as hereinafter more fully set forth.

In the accompanying drawing, Figure 1 is a diagrammatic view of a system of control embodying my invention; and Fig. 2 is a similar view of a modification thereof.

Referring to Fig. 1, the system here shown comprises a plurality of suitable supply-circuit conductors respectively marked "Trolley" and "Ground"; a main dynamo-electric machine having an armature A and a preferably sub-divided field winding F that is connected in series with the armature A through a reversing switch RS1 of any suitable type; an auxiliary motor-generator set comprising an armature M, a shunt-excited field winding MF1 and a series-excited field winding MF2 therefor, the field windings MF1 and MF2 during regeneration being differentially disposed with respect to each other, that is, they are adapted to create opposing fluxes, for a purpose to be described, a second armature G that is mechanically connected to the armature M in any suitable manner, and an exciting field winding GF1 for the armature G; a variable resistor R1 that is connected in series-circuit relation with the field winding MF1 of the motor-generator set through a suitable reversing switch RS2 across the supply circuit; and a plurality of switches 1 to 11, inclusive, for suitably manipulating the circuits of the main motor and of the motor-generator set.

The armature M and the field winding MF2 of the motor-generator set are thus connected in series-circuit relation with the main dynamo-electric machine, while the armature G, being connected directly across the supply circuit, is disposed in parallel-circuit relation to the series circuit just mentioned.

Assuming that it is desired to accelerate the main motor, the following method may be employed: The switches 1, 2, 3 and 9 are first closed, and the switches 4 to 8, inclusive, are then suitably manipulated to induce, in the armature M, an opposing voltage that is slightly less than the supply-circuit voltage, whereby a relatively small electromotive force is impressed upon the terminals of the main motor. The field winding MF2 is short-circuited by the switch 3 throughout the accelerating period. By successively opening the switches 4 to 8, inclusive, the voltage of the armature M may be gradually reduced, and the voltage of the armature A will be correspondingly increased until substantially supply-circuit voltage is impressed upon the terminals of the main motor. By reversing the excitation of the field winding MF1, the voltage of the armature M may be made to assist the supply-circuit voltage, whereby a still greater electromotive force may be applied to the main motor, and further acceleration may be effected. The switches 10 and 11 may also be manipulated, in accordance with familiar practice, to effect "field-control" of the main motor. During the acceleration of the main motor, the armature G either absorbs energy from the supply circuit or returns energy thereto, according to the action of the armature M which acts at times as a motor and at times as a generator.

More specifically stated, while the voltage of the main armature A is below the supply-circuit voltage, that is, during the first half of the accelerating period, the auxiliary armature M acts as a motor or "negative booster" and the armature G as a generator. When the voltage impressed upon the main armature A exceeds the supply-circuit voltage, that is, during the latter portion of the accelerating period, the auxiliary armatures interchange functions, the armature M acting as a "positive booster" driven by the armature G. This action follows from the following well-known principles: A machine is a motor when current flows in the opposite direction to the voltage induced in the machine, and it is a generator when current flows in the same direction as the voltage induced in the machine. Consequently, the reversal in voltage relations between the supply circuit and the main armature A is caused and accompanied by the above-recited reversal of action of the auxiliary machines in accordance with the principles stated.

The method of acceleration just outlined forms no material part of my present invention and is fully set forth in my co-pending application, Serial No. 35,166, filed June 19, 1915.

Assuming that the main motor is coasting and that it is desired to effect regeneration, the field winding F of the main dynamo-electric machine is first reversed for a well-known purpose, and the switches 1, 2 and 9 may be closed. The voltage of the auxiliary armature M is influenced only by the excitation of the shunt field winding MF1 and an electromotive force higher than the supply-circuit voltage obtains upon the auxiliary armature M, by suitable manipulation of the switches 4 to 8, as more fully explained in connection with Fig. 2. The main armature A thus has a certain negative voltage impressed upon it, that is, the difference between the voltage of the auxiliary armature M and the supply-circuit voltage, the term "negative" implying that the impressed main-machine voltage is reversed with respect to the direction of the supply-circuit voltage.

Upon the closure of the switch 10, the regenerated current rapidly builds up, reversing the above-mentioned negative voltage of the main armature A, and causing a certain relatively rapid decrease of the voltage of the auxiliary armature M, by reason of the differential connection of the auxiliary field winding MF2. Thus, the current generated by the main armature is maintained at a predetermined suitable operating value. The negative voltage in question is reversed because, with the auxiliary field winding MF1 alone active, the counter electromotive force of the armature M is larger than the supply-circuit voltage, thus producing a negative resultant. When the regenerative current flows differentially through the field winding MF2, the voltage of M becomes smaller than the supply-circuit voltage, thus producing a positive resultant. Were it not for the fact that the field windings MF1 and MF2 are differentially disposed with respect to each other during the regenerative period, a relatively high regenerative voltage and a heavy rush of current would result at this time. However, the arrangement of parts is such that the effective field flux of the armature M is maintained at suitable operating values, whereby the voltage of the armature M is decreased in substantially the same proportion as the voltage of the main armature A increases.

Further regulation of the regenerative operation, as the speed of the main machine decreases, may be effected by gradual closure of the resistor-short-circuiting switches 4 to 8, inclusive, to vary the action of the armature M with respect to the main machine. During the greater portion of the regenerative period, while the main-armature voltage is below the supply-circuit voltage, the auxiliary armature G acts as a motor to drive the armature M as a generator to deliver the voltage requisite to maintain regenerative operation of the system. By gradually closing the switches 4 to 8, inclusive, to increase the differential action of the shunt field winding MF1, the voltage of the auxiliary armature M is gradually increased to compensate for the decrease in speed of the momentum-driven main machine.

Reference may now be had to Fig. 2, wherein the system shown comprises the supply-circuit conductors Trolley and Ground, the main dynamo-electric machine, as described in connection with Fig. 1, and an auxiliary motor-generator set that is similar to the set already described. The armature M of the motor-generator set is provided with a field winding MF1 that is adapted for connection, through a resistor R1, across the supply circuit and is also provided with a field winding MF2 that is connected in series relation with the armature M, the field windings MF1 and MF2 being again normally differentially disposed with respect to each other during the regenerative period. The armature G of the motor-generator set is provided with a field winding GF1 that is connected across the supply circuit through a suitable variable resistor R2 and with a second field winding GF2 that is connected in series relation with the armature G and is directly connected to the field winding MF2, the field windings GF1 and GF2 being also differentially disposed with respect to each other under regenerative conditions. The armature M, field windings MF2 and GF2 and the armature G are, consequently, connected across the supply circuit, and the main dynamo-electric machine is disposed in series relation with a variable resistor R3, between the negative conductor Ground and a point intermediate the field windings MF2 and GF2 of the motor-generator set.

Assuming that conditions are suitable for regenerative operation, the switches 1, 2 and 3 may be closed and the switches 4 and 5 may be manipulated to produce a voltage in the armature M that is preferably slightly higher than the supply-circuit voltage, as about to be more fully explained. Upon the initial connection of the motor-generator set across the supply circuit, the auxiliary motor and generator armatures tend to rotate in opposite directions by reason of the relations of the field-winding currents and armature currents of the respective auxiliary machines. However, since the auxiliary generator armature G is provided with a relatively weak field excitation, by reason of the open condition of its field-winding-circuit switches 6 and 7, the action of the auxiliary armature M predominates and such auxiliary armature acts as a motor to drive the other auxiliary armature G as a voltage booster to supply an additional voltage in the same direction as the supply-circuit voltage to the auxiliary motor armature. The voltage and speed of the auxiliary motor armature M are thus increased beyond normal conditions, the voltage thereof being raised an amount substantially equal to the auxiliary generator voltage above the supply-circuit voltage. Since the auxiliary armature G adds a voltage to the supply-circuit voltage, it follows that the voltage of armature M is greater than the supply-circuit voltage. However, the voltage of the armature G, although positive with respect to the supply-circuit voltage, is temporarily negative with regard to the main-machine voltage.

Upon the subsequent connection of the main armature to an intermediate point of the motor-generator-set circuit by the closure of switch 8, the effect of a relatively low negative voltage is thus temporarily impressed upon the main armature from the auxiliary generator armature, whereby the regenerative voltage of the main machine is rapidly built up in the proper direction. A current thus initially flows from one terminal of the auxiliary armature G through the main field winding F, the main armature A, the resistor R3, the switch 8, and the differentially-wound series field winding GF2. Such building up of the main-machine voltage to the full value reverses the voltage of the auxiliary generator armature, through which the current, however, flows in the same direction as before, whereby the auxiliary machine G is converted to a driving motor for the motor-generator set. On the other hand, such building up of the main-machine voltage reverses the direction of current in the previous auxiliary motor armature, but the voltage relations thereof are unchanged and, consequently, the auxiliary machine M is changed to a generator. Excessive rushes of current at this time, however, are prevented partially by the resistor R3, and chiefly by reason of the differential connections of the pairs of field windings that are respectively associated with the armatures M and G, in a manner similar to that hereinbefore described. The resistors R1 and R2 may then be suitably manipulated to vary the voltages impressed upon the armatures M and G, the voltage of the armature M being gradually increased to substantially supply-circuit voltage, and the shunt-excited voltage of the armature G being gradually increased, while the differentially-acting series-excited voltage remains substantially constant. Thus the effective voltage of the generator G is gradually reduced, in accordance with the electromotive force generated by the main machine, which gradually decreases as the machine speed approaches zero. The resistor R3 will, of course, also be excluded from circuit by the closure of switches 9 and 10, either before or during the regulation by the motor-generator set.

Inasmuch as the current traversing the main machine partially traverses the armature M and partially traverses the armature G, it will be appreciated that the necessary capacity of the motor-generator set is considerably smaller than the corresponding necessary capacity of the motor-generator set that is employed in connection with the system illustrated in Fig. 1. The operation of the auxiliary motor-generator set whereby a smaller necessary capacity is obtained is set forth more fully in my above-identified co-pending application. It should be noted that, in the system just described, the highly inductive field windings MF2 and GF2, being connected in series-circuit relation with the armatures M and G, will have a tendency to act as choke coils to aid in preventing sudden rushes of current or other excessive disturbances in the circuits.

I do not wish to be restricted to the specific circuit connections and arrangement of parts herein set forth, as many modifications thereof may be made within the spirit and scope of my invention. I desire, therefore, that only such limitations shall be imposed as are indicated in the appended claims.

I claim as my invention:

1. In a system of control, the combination with a supply circuit, and a dynamo-electric machine having an armature and a field-magnet winding excited solely therefrom during regenerative operation, of an auxiliary motor-generator set having one armature in series relation with said machine, and means associated with said set for gradually increasing the voltage of the said armature of said set to apply a decreasing voltage to the main machine, and vice versa, said motor-generator set embodying differentially-acting field windings to prevent surges of regenerative current.

2. In a system of control, the combination with a supply circuit, and a main dynamo-electric machine having an armature and a field-magnet winding excited solely therefrom during regenerative operation, of an auxiliary motor-generator set having one armature in series relation with said machine, said armature being provided with a shunt-excited field winding and with a series excited field winding differentially connected with respect thereto under regenerative conditions, and means associated with said shunt-connected winding for gradually increasing the voltage of the said armature of said set to apply a decreasing voltage to the main machine, and vice versa.

3. In a system of control, the combination with a supply circuit, and a dynamo-electric machine having an armature and a field-magnet winding excited solely therefrom during regenerative operation, of an auxiliary motor-generator set having one armature in series relation with said machine and its other armature connected to the supply circuit, said auxiliary armature being provided with a supply-circuit-excited field winding and with a series-excited field winding differentially connected with respect thereto under regenerative conditions, a resistor in circuit with the supply-circuit excited field winding, and means for varying said resistor to gradually increase the voltage of said auxiliary armature to thereby decrease the regenerated voltage of the main machine, and vice versa.

4. In a system of control, the combination with a supply circuit, and a dynamo-electric machine having an armature and a field-magnet winding, of an auxiliary motor-generator set having its armatures and a plurality of corresponding field windings all connected in series relation across the supply circuit, means for connecting the main machine to an intermediate point of the motor-generator set circuit, and means for varying the voltage of the auxiliary machines to effect regulation of the main machine.

5. In a system of control, the combination with a supply circuit, and a dynamo-electric machine having an armature and a field-magnet winding excited solely therefrom during regenerative operation, of an auxiliary motor-generator set having its armatures and a plurality of corresponding series field windings all connected in series relation across the supply circuit and also having a plurality of variable shunt field windings respectively corresponding to the armatures of the set and respectively differentially connected with respect to the corresponding series field windings, means for connecting the main machine to substantially the mid-point of the motor-generator set armature circuit, and means for oppositely and simultaneously varying the voltages of the motor-generator set armatures to effect regulation of the main machine.

6. In a system of control, the combination with a supply-circuit, and a momentum-driven dynamo-electric machine having an armature and a field-magnet winding, of means for initially impressing a voltage of predetermined magnitude and direction upon the main machine, means for reversing said voltage upon connection of the motor to the supply circuit, and means for subsequently varying said reversed voltage.

7. In a system of control, the combination with a supply-circuit, and a momentum-driven dynamo-electric machine having an armature and a field magnet winding, of an auxiliary driven dynamo-electric machine having a series field winding connected in circuit with said armature and having a shunt-field winding differentially-connected with respect to said series-winding, means for energizing said shunt field winding to initially impress a relatively small voltage in a predetermined direction upon the main machine, means for then connecting the main machine to said supply circuit, whereby said voltage is reversed, and means for subsequently varying said reversed voltage to regulate the regenerative operation of said main machine.

8. The method of effecting regenerative control of a momentum-driven dynamo-electric machine adapted to be connected to a supply circuit and having an armature and a field magnet winding which consists in connecting said machine to the supply circuit, initially impressing a voltage of predetermined magnitude and direction upon the main machine, and then reversing said voltage while the main machine remains connected to the supply-circuit.

9. The method of effecting regenerative control of a momentum-driven dynamo-electric machine adapted to be connected to a supply circuit and having an armature and a field-magnet winding which consists in connecting said machine to the supply circuit, initially impressing a relatively small voltage in a predetermined direction upon the main machine, then reversing said voltage while the main machine remains connected to the supply circuit, and finally varying said reversed voltage to regulate the regenerative operation of said main machine.

10. In a system of regenerative control, the combination with a supply circuit and a main dynamo-electric machine, of an auxiliary armature connected in circuit with the main machine, a second auxiliary armature mechanically connected to the first-named auxiliary armature, and exciting means connected with the main machine and at least one of the auxiliary machines for simultaneously increasing the electromotive force impressed on the main machine and the internal electromotive forces thereof upon an increase of the regenerated current thereof.

11. In a system of regenerative control, the combination with a supply circuit, and a momentum-driven dynamo-electric machine having an armature and a field-magnet winding, of a plurality of auxiliary armatures respectively connected in series relation with, and in parallel relation to, said main machine, each of said auxiliary armatures being excited in some degree by a field winding that is traversed by a current inherently modified by variations in the regenerated current of the main machine.

In testimony whereof, I have hereunto subscribed my name this 30th day of June, 1915.

RUDOLF E. HELLMUND.